Figure 1:
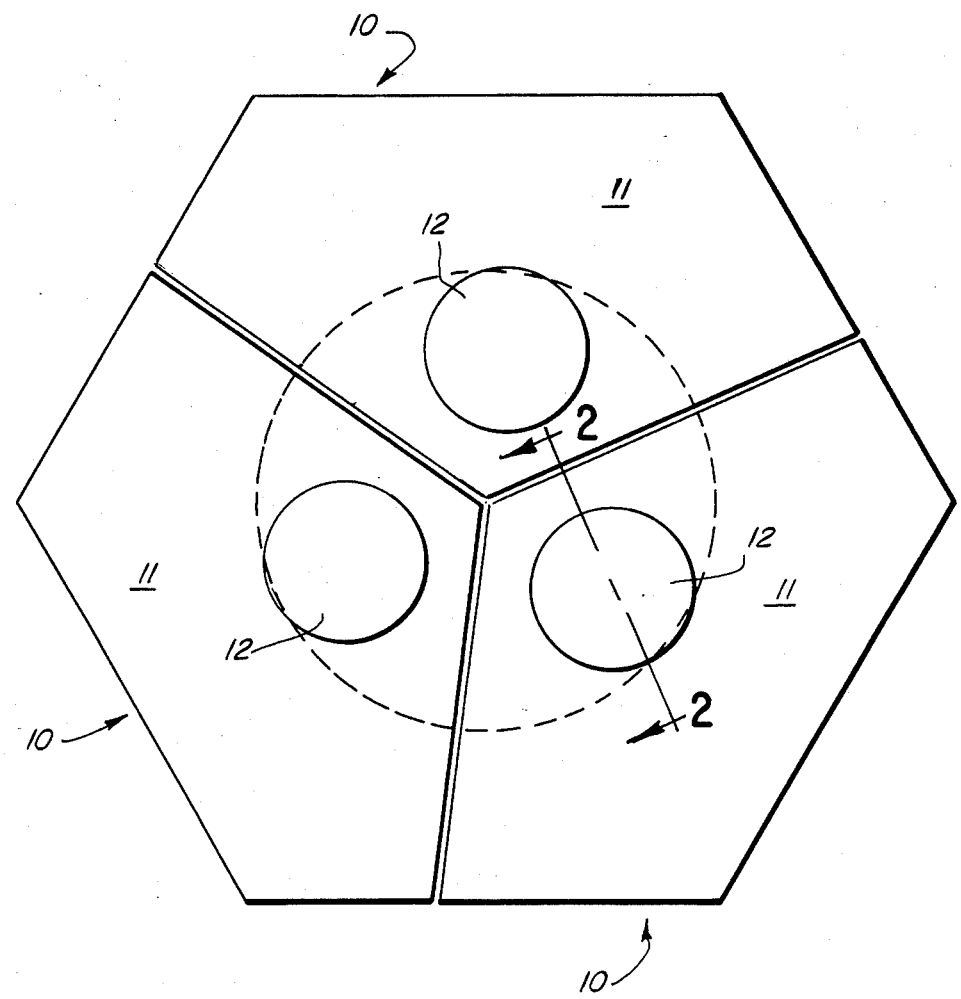

United States Patent [19]

Betts, Jr. et al.

[11] Patent Number: 4,673,548

[45] Date of Patent: Jun. 16, 1987

[54] THERMAL BARRIER AND SUPPORT FOR NUCLEAR REACTOR FUEL CORE

[75] Inventors: William S. Betts, Jr.; J. Larry Pickering, both of Del Mar; William E. Black, San Diego, all of Calif.

[73] Assignee: The United States of America as represented by the United States Department of Energy, Washington, D.C.

[21] Appl. No.: 646,312

[22] Filed: Aug. 31, 1984

[51] Int. Cl.$^4$ .............................................. G21C 13/04
[52] U.S. Cl. ..................................... 376/362; 376/289
[58] Field of Search ............... 376/280, 289, 302, 362, 376/461; 52/292, 393, 573

[56] References Cited

U.S. PATENT DOCUMENTS

| | | | |
|---|---|---|---|
| 2,919,476 | 1/1960 | Fritz | 52/393 |
| 3,228,852 | 1/1966 | Holmes et al. | 376/289 |
| 3,359,175 | 12/1967 | Arthur et al. | 376/362 |
| 3,776,814 | 12/1973 | Lockett et al. | 376/289 |
| 3,821,079 | 6/1974 | Jabsen | 376/289 |
| 3,881,288 | 5/1975 | Fay | 376/289 |
| 3,920,518 | 11/1975 | Brissaud et al. | 376/289 |
| 3,978,633 | 9/1976 | Scheidler et al. | 52/573 |
| 3,979,866 | 9/1976 | Prescott et al. | 376/289 |
| 4,112,648 | 9/1978 | Suzuki et al. | 376/289 |
| 4,154,650 | 5/1979 | Prescott et al. | 376/289 |
| 4,234,384 | 11/1980 | Fritz et al. | 376/362 |

*Primary Examiner*—Deborah L. Kyle
*Assistant Examiner*—Richard L. Klein
*Attorney, Agent, or Firm*—Fitch, Even, Tabin & Flannery

[57] ABSTRACT

A thermal barrier/core support for the fuel core of a nuclear reactor having a metallic cylinder secured to the reactor vessel liner and surrounded by fibrous insulation material. A top cap is secured to the upper end of the metallic cylinder that locates and orients a cover block and post seat. Under normal operating conditions, the metallic cylinder supports the entire load exerted by its associated fuel core post. Disposed within the metallic cylinder is a column of ceramic material, the height of which is less than that of the metallic cylinder, and thus is not normally load bearing. In the event of a temperature excursion beyond the design limits of the metallic cylinder and resulting in deformation of the cylinder, the ceramic column will abut the top cap to support the fuel core post.

4 Claims, 2 Drawing Figures

THERMAL BARRIER AND SUPPORT FOR NUCLEAR REACTOR FUEL CORE

BACKGROUND OF THE INVENTION

The government has rights in this invention pursuant to Contract No. DE-AT03-76SF70046 awarded by the U.S. Department of Energy.

This invention relates generally to a thermal barrier for a nuclear reactor vessel and, more particularly, to a thermal barrier that supports a fuel column within the reactor vessel.

In a well known reactor, the fuel columns of the reactor core are contained within a reactor vessel usually made of prestressed concrete and having a fixed, rigid metal liner. The reactor core is cooled by circulating an inert gas, such as helium, therethrough, and coolant pipes are embedded in the prestressed concrete reactor vessel for cooling the vessel. The metal reactor vessel liner is provided with a thermal shield which also acts to support the reactor core. Such a nuclear reactor is shown and described in U.S. Pat. No. 3,733,760, which is herein incorporated by reference.

The thermal barriers used in these reactors have typically included in their construction ceramic materials, due to their generally superior refractory characteristics, in combination with graphite and steel. Such a barrier is disclosed in U.S. Pat. No. 3,776,814. In such prior thermal barriers, the ceramic materials are load-bearing, and are used to support the fuel columns of the reactor core.

In arriving at a design for a thermal barrier/core support, both long life and a high margin of safety are desirable and necessary features. While the high temperature characteristics of ceramics are superior, the data base with respect to the structural characteristics of ceramics is not nearly as well developed as the data base for metals. It is known, for example, that ceramics are susceptible to static fatigue when subjected to a constant stress. However, the endurance limit of ceramics with respect to static fatigue is not well defined.

Under normal operating conditions, the temperatures attained within the reactor vessel are not sufficiently high to cause thermal failure, i.e., plastic deformation, of the metals employed within the reactor vessel. Thus, since the mechanical behavior of metals is well documented, designers feel very confident using metal under normal operating conditions for structural purposes. However, metals are subject to slow plastic deformation ("creep") when subjected to high temperatures even when under low stress, to which ceramics are not subject. Thus, while metal structures perform satisfactorily under normal operating conditions, with such performance being predictable with a high degree of confidence, ceramic materials are superior performers at the high temperatures which can be encountered in a system failure, but the behavioral characteristics of the ceramics are less well documented.

Accordingly, it is the primary object of the instant invention to provide a thermal barrier for supporting the fuel core of a nuclear reactor which has highly predictable behavioral characteristics of metals with the refractory characteristics of ceramics.

Figure 2:
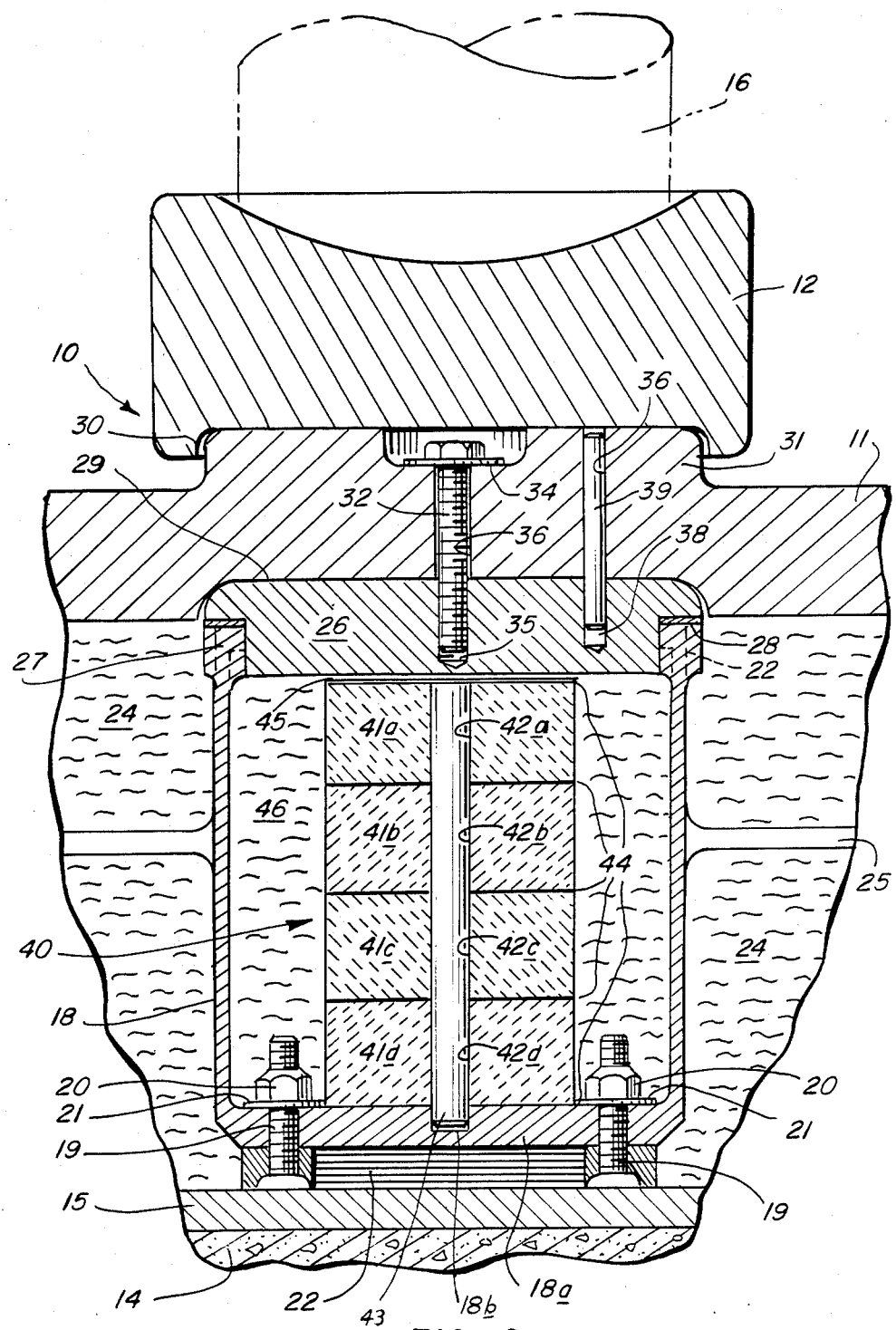

Other objects of the invention will become apparent to those skilled in the art from the following description, taken in connection with the accompanying drawings wherein:

FIG. 1 is a top view of a thermal barrier and support embodying the instant invention; and FIG. 2 is a cross-sectional view of one of the supports taken substantially along line 2—2 of FIG. 1.

Generally, the thermal barrier/core support of the invention comprises a metallic core support preferably in the form of a cylinder secured to the metal liner of the reactor vessel and surrounded by fibrous insulation material that also covers the metal liner. Resting on top of the cylinder are means including a post seat that locate and support one of the posts that extends from the fuel core. Under normal operating conditions, the metallic cylinder supports the entire load exerted by its associated fuel core post. Disposed within the metallic cylinder is a column of ceramic material, the height of which is less than that of the metallic cylinder, and thus is not normally load bearing. In the event of a temperature excursion beyond the design limits of the metallic cylinder which results in deformation of the cylinder, the ceramic column will abut the means including the post seat to support the fuel core post.

Referring now more particularly to FIG. 1, a group of three identical support structures 10 of the type embodying the present invention are shown. Each support structure 10 includes a graphite cover block 11 and graphite post seat 12, with each group of three support structures 10 cooperating to partially support three fuel column regions and/or peripheral reflector blocks of the reactor core (not shown). The support structures 10 of each group are positioned 120° apart and their cover blocks 11, slightly spaced to account for relative motion due to thermal expansion and contraction, cooperate to form a hexagon. A typical size for each hexagon is approximately 17.5 square feet, with each side of the hexagon measuring approximately 22 inches. Such hexagon-forming support structures cover substantially the entire floor of the reactor vessel to support the reactor core, and in a typical reactor design, as many as 500 support hexagons may be utilized.

Turning now to FIG. 2, a single support structure 10 is shown in greater detail. A portion of the prestressed concrete nuclear reactor vessel is illustrated at 14. The reactor vessel 14 is provided with a steel wall or liner 15 suitably anchored to the concrete reactor vessel 14 by means not shown. The vessel 14 and liner 15 define a chamber that contains the reactor core (not shown). The reactor core comprises a plurality of fuel columns typically supported by a graphite block and having a plurality of vertical graphite posts extending therefrom, such as that indicated by 16. To support the posts 16, each support 10 includes a metal core support preferably in the form of a cylinder 18 which is firmly attached to the steel liner 15 by means of rigid threaded studs 19 that have been welded to the liner 15 and extend through the base 18a of the cylinder 18. The cylinder 18 is removably secured to the studs 19 by the nut-washer combinations 20, 21. Such cylinders 18 are typically 8.5 inches tall and made from a high temperature metallic alloy. Shims 22 are inserted between the base of the metal cylinder 18 and the liner 15 to adjust the height of the support assembly and insure correct positioning of the associated cover block 11.

To provide low heat loss and prevent deterioration of the structural integrity of the reactor vessel 14, the inside of the steel liner 15 includes a layer of fibrous thermal insulation material 24 surrounding the support cylinder 18. In the illustrated embodiment, the insulation 24 is in two layers and is compressed against the liner 15 by an intermediate cover plate 25, typically made of steel, and the graphite cover block 11.

For seating the cover block 11 on the support cylinder 18, the cylinder 18 includes a top cap 26. The top cap is preferably made from a high temperature metallic alloy and is secured to the cylinder 18 by means of bayonet locks 27, with an interface material 28 between the top cap 26 and the top of the cylinder 18. The lower surface of the cover block 11 is recessed at 29 so as to seat on the top cap 26 and positively locate the cover block 11 with respect to the cylinder 18. Similarly, the post seat 12 is recessed at 30 to mate with the shoulder 31 on the upper surface of the cover block 11. When carrying the post 16, the weight of the reactor core is sufficient to hold the cover block 11 and post seat 12 in position on the support cylinder 18 and to compress the insulation 24 against the steel liner 15. However, during installation, the cover block 11 is held in position by means of a countersunk draw-down bolt 32 and washer 34 received in a threaded blind hole 35 in the top cap 26. To properly orient the cover block 11 with respect to the top cap 26, a through hole 36 in the cover block 11 is aligned with a blind hole 38 in the top cap 26. A pin 39 is inserted into the aligned holes 36, 38 to maintain their relative positions.

While the support system thus described performs satisfactorily when the atmosphere in the reactor vessel is within normal operating temperatures, if the design temperature of the reactor vessel should be exceeded, the metal cylinder 18 of the support could deform due to excessive creep and, possibly, fail. Accordingly, in keeping with the invention, a column of ceramic material 40 is provided within the cylinder 18 to support the top cap-cover block-post seat combination should the cylinder 18 fail due to excessive thermal deformation.

Referring again to FIG. 2, the ceramic column 40 comprises four ceramic pads 41a-d each of cylindrical shape and having a central bore 42a-d, respectively, therethrough. The pads 41a-d are stacked with their bores 42a-d aligned and have an interface material 44 of ceramic cloth placed between the abutting faces of the pads 41a-d and on the outer faces of pads 41a and d. To maintain the pads 41a-d in aligned position, an upstanding ceramic dowel or post 43 is secured in a blind hole 18b in the base 18a of the support 18 and extends through the central bores 42a-d of the pads 41a-d.

To insure that the ceramic column 40 will bear the load of the reactor core only upon the failure of the support cylinder 18, the column 40 is sized in height so that a gap 45 is left between the top of the column 40 and the underside of the top cap 26. The gap 45 should be sufficiently sized so as to accommodate the thermal expansion and contraction of the support cylinder 18 and ceramic column 40, without the top of the column 40 engaging the underside of the top cap 26, which would exert a compressive force on the column. A gap 45 of 0.125 inches is believed to be satisfactory for a column 8.5 inches in height. To reduce the heat flow to the steel liner 15 and to minimize radial temperature gradients in the ceramic pads 41a-d, the interior of the support cylinder 18 contains additional fibrous thermal insulation material 46.

It may therefore be seen that the invention provides a support for the fuel core of a nuclear reactor that utilizes the most desirable mechanical and thermal characteristics of both high temperature metallic alloys and ceramics so as to provide a reliable back-up support in the event of a failure. While the invention has been described in connection with a preferred embodiment, it will be understood that it is not intended to limit the invention to that embodiment. On the contrary, it is intended to cover all alternatives, modifications, and equivalents included within the scope of the appended claims.

We claim:

1. In a nuclear reactor having a thermal barrier for supporting a fuel column of a nuclear reactor core within a reactor vessel having a fixed rigid metal liner, the fuel column having a refractory post extending downwardly therefrom, the thermal barrier comprising, in combination, a metallic core support having an interior chamber secured to the metal liner; fibrous thermal insulation material covering the metal liner and surrounding the metallic core support; means associated with the metallic core support and resting on the top thereof for locating and supporting the full column post; and a column of ceramic material located within the interior chamber of the metallic core support, the height of the column being less than the height of the metallic core support so that the ceramic column will engage the means for locating and supporting the fuel column post only upon plastic deformation of the metallic core support; the core support comprising a metallic cylinder and the ceramic column comprising a plurality of coaxially aligned ceramic pads, each pad having a hole therethrough and being located within the metallic cylinder by means of a ceramic post passing through the holes in the pads.

2. The combination of claim 1 further comprising fibrous insulation within the interior chamber of the metallic core support and surrounding the ceramic column.

3. The combination of claim 1 wherein the means for locating and supporting the fuel column post further comprises a refractory cover block overlying and compressing the fibrous thermal insulation material.

4. The combination of claim 1 wherein the means for locating and supporting the fuel column post further comprises a top cap closing the upper end of the metallic cylinder and a refractory cover block overlying and compressing the fibrous thermal insulation, with the post seat resting on the cover block.

* * * * *